J. H. McCONNELL.
Pivoted Lid for Culinary Vessels.

No. 133,326. Patented Nov. 26, 1872.

Attest:
Wm. W. S. Dyre.
Edw. W. Donn

Inventor:
James H. McConnell
By J. J. Johnston & Bro
his attorneys

UNITED STATES PATENT OFFICE.

JAMES H. McCONNELL, OF BEAVER FALLS, PENNSYLVANIA.

IMPROVEMENT IN PIVOTED LIDS FOR CULINARY VESSELS.

Specification forming part of Letters Patent No. 133,326, dated November 26, 1872; antedated November 25, 1872.

*To all whom it may concern:*

Be it known that I, JAMES H. MCCONNELL, of Beaver Falls, in the county of Beaver and State of Pennsylvania, have invented a certain new and useful Improvement in Pivoting Lids on Culinary Vessels, the same being a new article of manufacture; and I do hereby declare that the following is a full, clear, and exact description thereof, reference being had to the accompanying drawing and to the letters of reference marked thereon.

The nature of my invention and new article of manufacture consists in providing a culinary vessel, at one side of its lip or mouth, with a segment of a flange provided with a slot for the reception of a pin projecting downward from the under side of its lid, the said pin being provided with a broad flat head; the whole being so constructed and arranged that the lid may be moved sidewise, elevated, or removed from the vessel at pleasure.

To enable others skilled in the art to make and use my new article of manufacture, I will proceed to describe its construction and operation.

Figure 1:
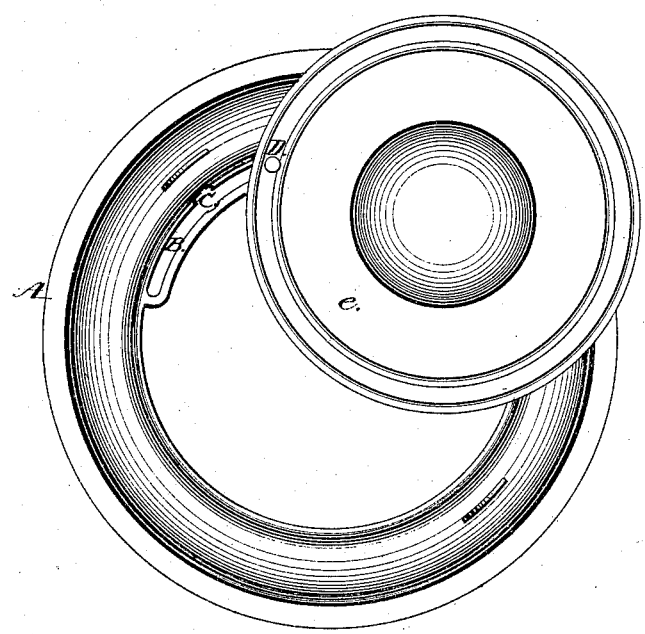
Figure 2:
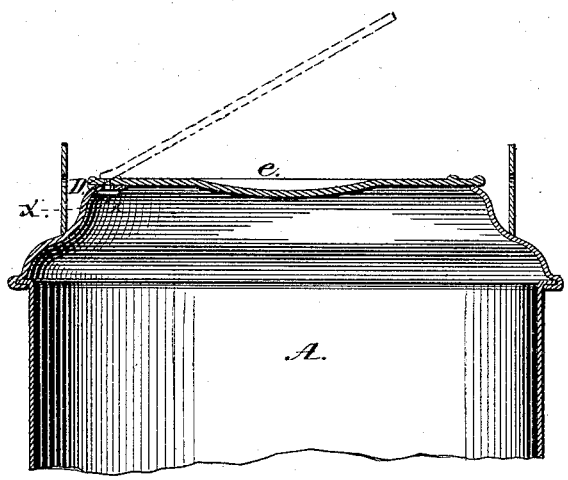

In the accompanying drawing which forms part of my specification, Figure 1 is a top view or plan of my new article of manufacture. Fig. 2 is a vertical section of the same.

A represents the body of the vessel provided at its mouth with a slot, B, having an enlargement, C, to receive the head $x$ of the pin D on the under side of the lid $e$. The head $x$ of the pin D projects beyond the walls of the slot B, and the lid can only be removed by bringing the head $x$ of the pin directly under the enlargement C of the slot. By pivoting the lid $e$ to the vessel A, as hereinbefore described, the lid may be moved sidewise, as indicated in Fig. 1, so as to clear the entire mouth of the vessel, or it may be elevated, as indicated by the dotted lines in Fig. 2, or the lid may be removed entirely from the vessel.

The advantages resulting from the herein-described arrangement of the lid with relation to the body A are too apparent to require description.

What I claim is—

A new article of manufacture in culinary vessels, viz: The mouth of a tea-kettle or other culinary vessels provided with a segment of a flange, said segment having a slot in which is secured the pivot of the lid used in connection with such vessel or vessels, all constructed as herein described.

JAMES H. McCONNELL.

Witnesses:
 C. W. SAYLER,
 JAMES J. JOHNSTON.